United States Patent
Loken

(10) Patent No.: US 9,321,407 B2
(45) Date of Patent: Apr. 26, 2016

(54) COLLAPSIBLE BICYCLE RACK

(75) Inventor: Strahan Lingjerde Loken, Victoria (CA)

(73) Assignee: Danik Industries Limited (CA)

( * ) Notice: Subject to any disclaimer, the term of this patent is extended or adjusted under 35 U.S.C. 154(b) by 802 days.

(21) Appl. No.: 13/556,952

(22) Filed: Jul. 24, 2012

(65) Prior Publication Data

US 2014/0027484 A1    Jan. 30, 2014

(51) Int. Cl.
  *B60R 9/10*  (2006.01)
  *B60R 9/06*  (2006.01)
(52) U.S. Cl.
  CPC .... *B60R 9/10* (2013.01); *B60R 9/06* (2013.01)
(58) Field of Classification Search
  CPC ............ B60R 9/06; B60R 9/10; B60R 9/045; B25H 1/0014; B60P 3/077; B60P 3/075; B60P 3/07; Y10S 224/924; B62H 3/06
  USPC .............. 224/497, 502, 549, 42.34, 508, 504, 224/924, 519–521, 402–405, 534, 460, 455, 224/568, 42.13–42.15, 42.16, 42.19, 42.18, 224/42.28, 42.29, 42.3, 42.27, 42.26, 42.12, 224/925, 571, 537; 211/17–22, 5, 96, 99, 211/100; 403/65; 248/499
  See application file for complete search history.

(56) References Cited

U.S. PATENT DOCUMENTS

| | | | | |
|---|---|---|---|---|
| 3,374,899 A | * | 3/1968 | Bator | 211/96 |
| 5,526,971 A | | 6/1996 | Despain | |
| 5,579,972 A | * | 12/1996 | Despain | 224/506 |
| 6,783,041 B2 | | 8/2004 | Ford et al. | |
| 6,866,175 B2 | * | 3/2005 | Munoz et al. | 224/324 |
| 7,900,802 B2 | | 3/2011 | Hammond | |
| 2006/0237505 A1 | * | 10/2006 | Hammond | 224/521 |
| 2012/0027560 A1 | | 2/2012 | Olsen | |
| 2012/0125965 A1 | * | 5/2012 | Castro | 224/534 |

\* cited by examiner

*Primary Examiner* — Adam Waggenspack
*Assistant Examiner* — Matthew Theis
(74) *Attorney, Agent, or Firm* — Morland C. Fischer

(57) ABSTRACT

A collapsible bicycle rack to be transported at the rear of a motor vehicle for carrying bicycles that are suspended vertically and upside down relative to one another. The bicycle rack includes a vertical main support bar. An upper front wheel support basket is pivotally coupled to the main support bar to receive and retain the front wheels of the bicycles. A lower rear wheel support arm is pivotally coupled to the main support bar below the upper front wheel support basket to receive the rear wheels of the bicycles. The upper front wheel support basket and the lower rear wheel support arm are simultaneously rotated from an expanded deployed configuration extending outwardly from the vertical main support bar to a compact folded configuration lying generally side-by-side the vertical main support bar.

20 Claims, 8 Drawing Sheets

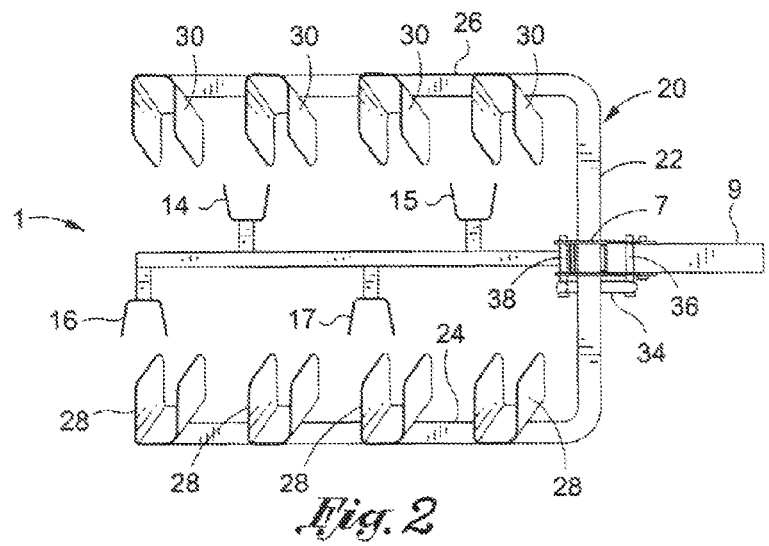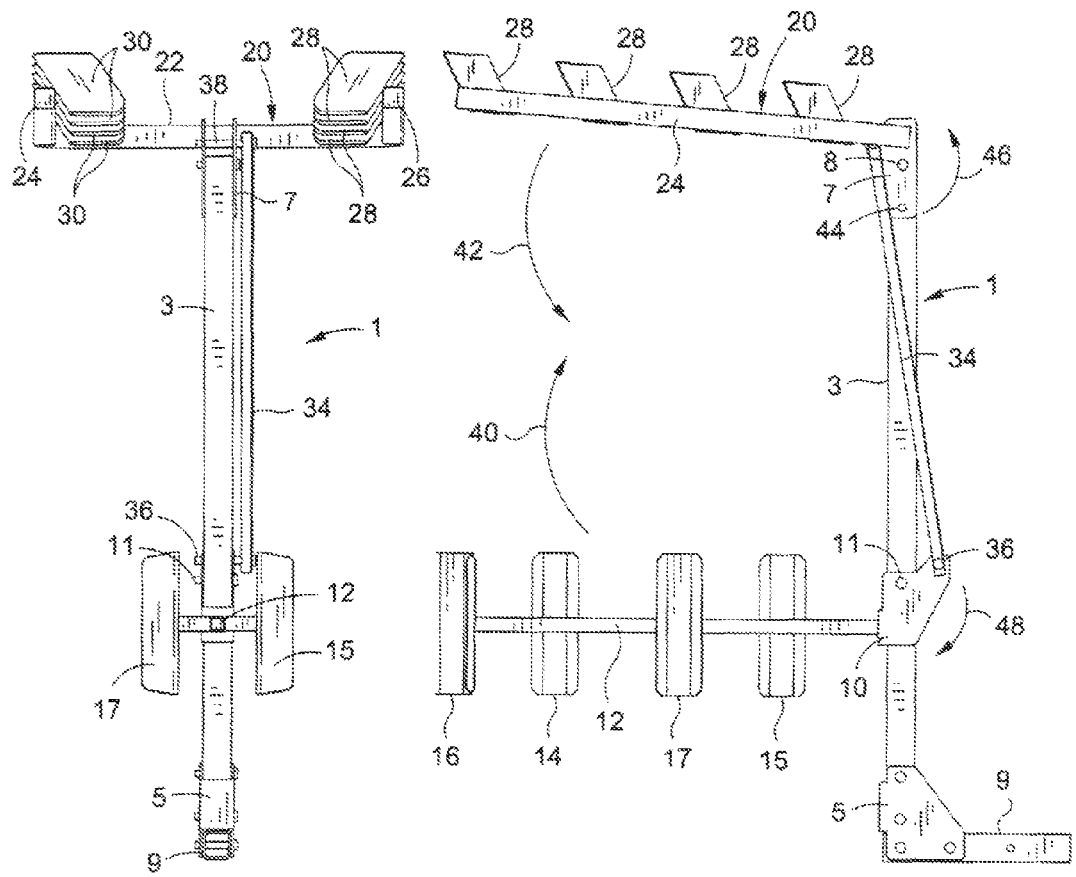

COLLAPSIBLE BICYCLE RACK

BACKGROUND OF THE INVENTION

1. Field of the Invention

This invention relates to a bicycle rack to be transported at the rear of a motor vehicle for carrying bicycles that are suspended vertically and upside down relative to one another so that their front wheels face up. The bicycle rack is adapted to be collapsed from an expanded deployed configuration when bicycles are being carried to a compact folded configuration when no bicycles are being carried.

2. Background Art

It is well known to connect a bicycle rack to a hitch at the rear of a motor vehicle so that one or more bicycles can be transported by the vehicle. In many racks, two or more bicycles are carried side-by-side in horizontal alignment. Such an alignment consumes a relatively large amount of space to create overhang at the rear of the vehicle and prevent the bicycles from being nested close together.

In some cases, the bicycle rack engages the fork crown of the bicycle. Because of the size and location of the fork crown, such bicycle rack is limited to carrying only certain types of bicycles. In other cases, a series of time-consuming and often cumbersome manipulations must be made in order to first attach a bicycle to and later detach the bicycle from the rack. In still other cases, when no bicycles are being carried by the bicycle rack, there is no easy way to collapse the rack into a compact and more space-efficient configuration without having to remove the rack altogether from the vehicle.

SUMMARY OF THE INVENTION

In general terms, a bicycle rack is disclosed by which a plurality of (e.g., four) bicycles can be carried vertically at the rear of a motor vehicle. Moreover, at least one bicycle can be transported by the bicycle rack upside down relative to at least one other bicycle. When no bicycles are being carried, the bicycle rack is adapted to be collapsed from an expanded deployed configuration to a compact folded configuration without having to be removed from the vehicle.

According to a preferred embodiment, the bicycle rack includes an upstanding main support bar which extends vertically upward from a main gusset to be coupled to the hitch of a motor vehicle by way of a receiver bar. An outstretched lower rear wheel support arm extends horizontally and outwardly from a rotatable lower linking arm support gusset that is pivotally attached in partial surrounding engagement to the vertical main support bar. A first pair of rear wheel holders at one side of the rear wheel support arm face in one direction and a second pair of rear wheel holders at the opposite side of the rear wheel support arm face in an opposite direction. The positions of the first pair of rear wheel holders along the support arm are staggered relative to the position of the second pair of rear wheel holders.

An outstretched U-shaped upper front wheel support basket extends substantially horizontally in a direction away from the vehicle and outwardly from a rotatable upper linking arm support gusset at the top of the vertical main support bar. A first set of four front wheel holders are attached to a first side bar of the support basket. A second set of four front wheel holders are attached to an opposite side bar of the support basket so as to face the first set of front wheel holders. The first and second sets of front wheel holders are attached to the upper front wheel support basket at an angle relative to the rear front wheel holders attached to the lower rear wheel support arm.

A linking arm extends along the vertical main support bar from a pivot pin that runs through the upper linking arm support gusset at the top of the main support bar to a linking pin that runs through the lower linking arm support gusset. When it is desirable to collapse the bicycle rack to its compact folded configuration, a downward pushing force is applied to the outstretched upper front wheel support basket to cause the support basket to rotate downwardly towards the vertical main support bar. The rotation of the front wheel support basket causes a linear force to be applied to the linking arm that extends between the pivot pin through the upper linking arm support gusset and the linking pin through the lower linking arm support gusset. Accordingly, the upper and lower linking arm support gussets rotate in opposite directions to impart a rotation to the outstretched lower rear wheel support arm, whereby the rear wheel support arm rotates upwardly towards the vertical main support bar.

With the bicycle rack in its expanded deployed configuration, the rear wheels of a first pair of bicycles to be carried are received and retained by a first of the pairs of rear wheel holders at one side of the lower rear wheel support arm. The rear wheels of a second pair of bicycles to be carried are received and retained by the second pair of rear wheel holders at the opposite side of the lower rear wheel support arm. Thus, the rear wheels of the first pair of bicycles are held in axial alignment with one another at one side of the lower rear wheel support arm, and the rear wheels of the second pair of bicycles are held in axial alignment at the opposite side of the support arm. Each front wheel of a bicycle to be carried is received and retained by a respective pair of opposing front wheel holders from the first and second sets thereof at the upper front wheel support basket. Because the sets of front wheel holders of the front wheel support basket are angled relative to the rear wheel holders, the front wheels of the bicycles will turn away from the vehicle. In this same regard, because of the staggered arrangement of the oppositely-facing rear wheel holders along opposite sides of the lower rear wheel support arm, a first pair of bicycles are carried upside down relative to a second pair of the bicycles.

Each bicycle is suspended vertically (i.e., front wheels up) alongside the vertical main support bar of the bicycle rack by means of the receipt of the front wheels of the bicycles by opposing pairs of front wheel holders from the front wheel support basket. The bicycles are engaged and held on the rack solely by means of the front and rear wheels thereof being received and retained by the front and rear wheel holders of the front wheel support basket and rear wheel support arm.

BRIEF DESCRIPTION OF THE DRAWINGS

FIG. 2 is a top view of the collapsible bicycle rack of FIG. 1;

FIG. 3 is a front view of the collapsible bicycle rack;

FIG. 4 is a side view of the collapsible bicycle rack;

DESCRIPTION OF THE PREFERRED EMBODIMENT

Figure 1:
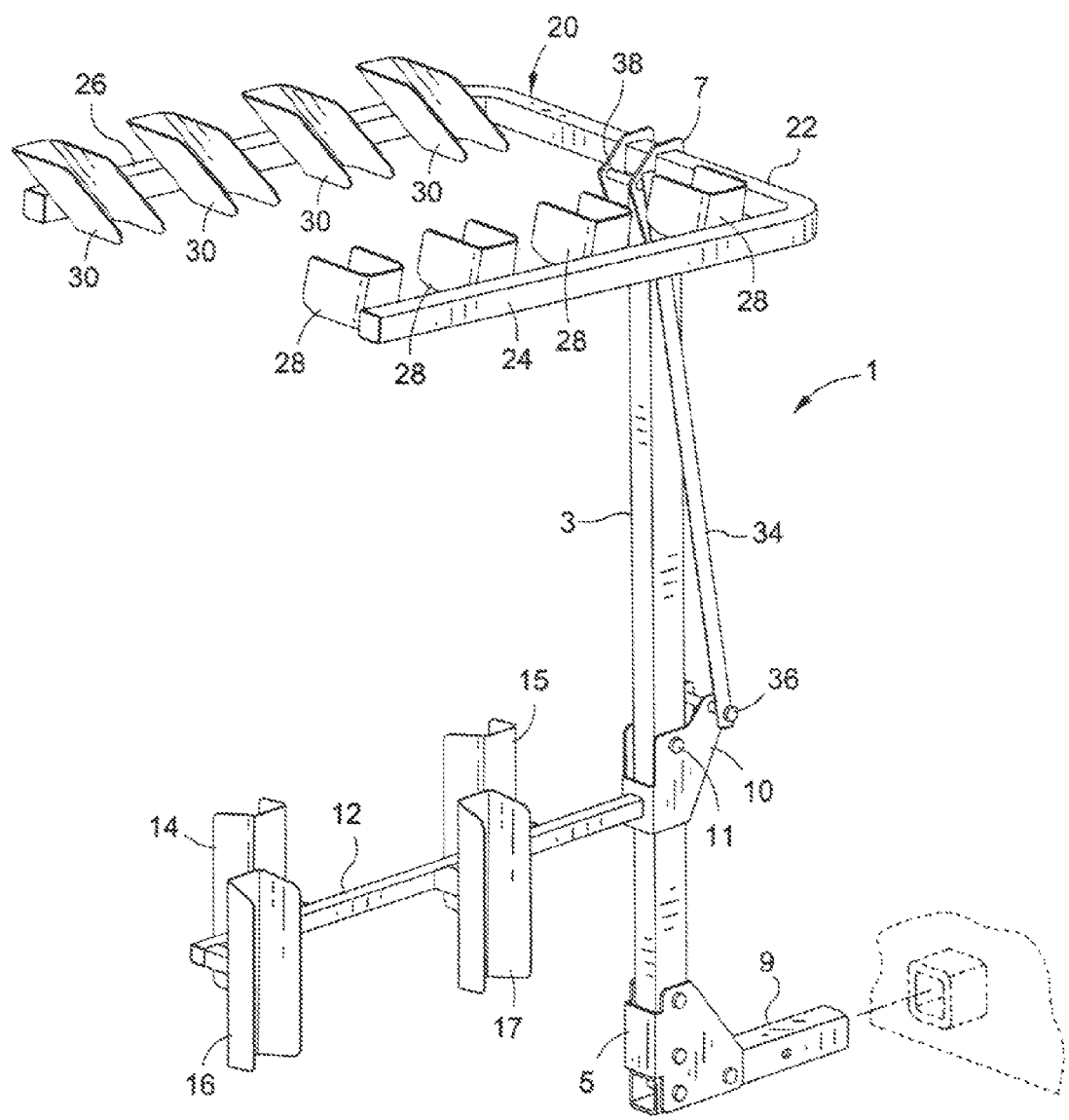
FIG. 1 is a perspective view of a collapsible bicycle rack according to a preferred embodiment of this invention with the bicycle rack in an expanded deployed configuration.
Figure 5:
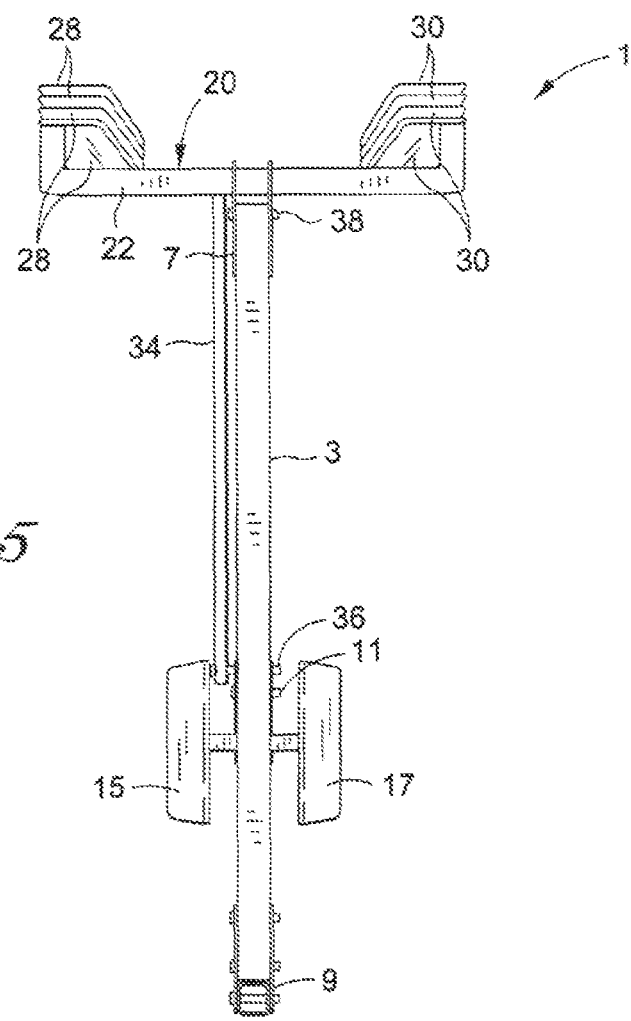
FIG. 5 is a rear view of the collapsible bicycle rack.
Figure 6:
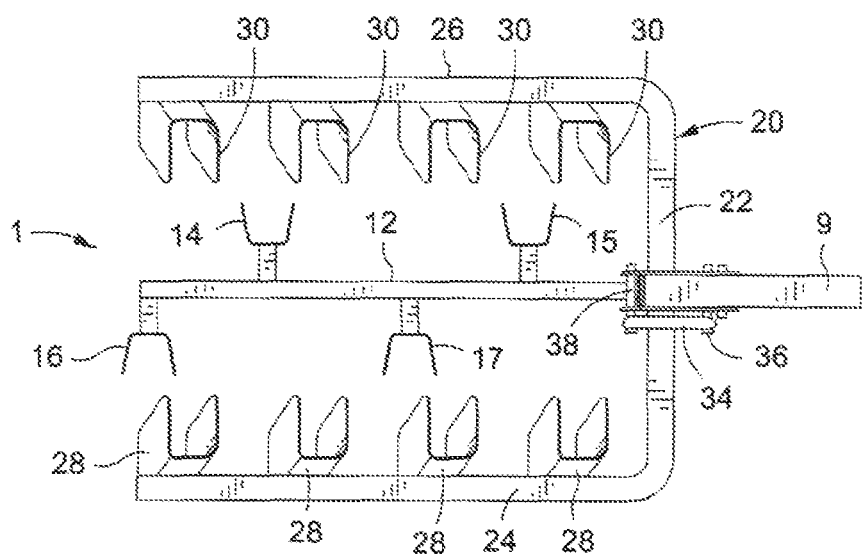
FIG. 6 is a bottom view of the collapsible bicycle rack.

A preferred embodiment for a collapsible bicycle rack 1 by which a plurality of (e.g., four) bicycles can be carried in spaced vertical alignment with one another at the rear of a motor vehicle is now described while referring concurrently to FIGS. 1-8 of the drawings. As will soon be explained, one pair of bicycles carried by the bicycle rack 1 is transported upside down relative to a second pair of bicycles. To conserve space when no bicycles are being transported, the bicycle rack 1 is adapted to be collapsed from an expanded deployed configuration into a compact folded configuration so as to lay close to the rear of the vehicle with which the rack is associated.

The collapsible bicycle rack 1 has a vertically-upstanding main support post or bar 3 which runs from a connection at the bottom thereof with a main gusset 5 to a connection at the top with a rotatable upper linking arm support gusset 7. The upper linking arm support gusset 7 is pivotally connected to the main support bar 3 by means of a pivot pin 8 (best shown in FIG. 4). Also connected to the main gusset 5 and extending outwardly therefrom in substantially perpendicular alignment with the vertical main support bar 3 is a receiver bar 9. The receiver bar 9 is sized and shaped so as to be detachably connected to a standard hitch at the rear of a motor vehicle (best shown in FIG. 1) to enable the bicycle rack 1 to be transported by the vehicle.

A rotatable lower linking arm support gusset 10 is pivotally connected by means of a pivot pin 11 in partial surrounding engagement with the main support bar 3 at a location between the main gusset 5 and the upper linking arm support gusset 7. A lower rear wheel support arm 12 is connected to and extends horizontally outward from the lower linking arm support gusset 10, such that the support arm 12 is held in substantially perpendicular alignment with the vertical main support bar 3. Lying at one side of the rear wheel support arm 12 is a first pair of U-shaped rear wheel holders 14 and 15. Lying at the opposite side of the rear wheel support arm 12 is a second pair of U-shaped rear wheel holders 16 and 17.

As an important detail of the collapsible bicycle rack 1, the first pair of rear wheel holders 14 and 15 face away from and lie in alternating alignment with respect to the second pair of rear wheel holders 16 and 17. That is to say, the U-shaped rear wheel holders 14 and 15 at one side of support arm 12 face in one direction, and the U-shaped rear wheel holders 16 and 17 at the opposite side of support arm 12 face in the opposite direction. What is more, the positions of the first pair of rear wheel holders 14 and 15 along the rear wheel support arm 12 are offset (i.e., staggered) relative to the positions of the second pair of rear wheel holders 16 and 17. Therefore, the rear wheel holder 15 at one side of the support arm 12 is held closest to the main support bar 3 while the rear wheel holder 16 at the opposite side is the furthest away from bar 3.

Each of the U-shaped rear wheel holders 14-17 is sized and shaped to receive therewithin and retain the rear wheel of one bicycle to be carried by the bicycle rack 1 herein disclosed. Inasmuch as a total of four rear wheel holders 14-17 are shown attached to the lower rear wheel support arm 12, a maximum of four bicycles may be carried by the bicycle rack 1. Nevertheless, it is to be expressly understood that the bicycle rack 1 may include more or less than four rear wheel holders in cases where more or less than four bicycles will be carried. However, it is preferable that the bicycle rack 1 have at least two rear wheel holders facing in opposite directions so that at least two bicycles can be carried at the rear of a vehicle.

A U-shaped upper front wheel support basket 20 is pivotally coupled to the top of the main support bar 3 by means of the rotatable upper linking arm support gusset 7. The upper front wheel support basket 20 extends outwardly and substantially horizontally from the vertical support bar 3 in a direction away from the motor vehicle. The basket 20 is spaced above the lower rear wheel support arm 12 and includes a cross bar 22 and a pair of side bars 24 and 26. The cross bar 22 of the U-shaped upper front wheel support basket 20 runs through and is affixed to the upper linking arm support gusset 7. The side bars 24 and 26 of the front wheel support basket 20 are co-extensive to and extend from the cross bar 22, such that the side bars 24 and 26 are held in spaced substantially parallel alignment with each other and with the lower rear wheel support arm 12.

A first set of (e.g., four) U-shaped front wheel holders 28 is attached to and evenly spaced from one another along a first 24 of the pair of side bars 24 and 26 of the upper front wheel support basket 20. A second set of (four) U-shaped front wheel holders 30 is attached to and evenly spaced from one another along the other one 26 of the pair of side bars 24 and 26 of the front wheel support basket 20. The sets of wheel holders 28 and 30 are attached to respective side bars 24 and 26 such that the first set of U-shaped front wheel holders 28 and the second set of U-shaped front wheel holders 30 face one another. Therefore, the first and second sets of front wheel holders 28 and 30 are aligned parallel to each other. However, as another important detail of the bicycle rack 1, the first and second sets of front wheel holders that are attached to the side bars 24 and 26 of the upper front wheel support basket 20 are held at an angle (e.g., of about 20-25 degrees) with respect to the U-shaped rear wheel holders 14-17 that are attached to the lower rear wheel support arm 12.

Each of the U-shaped front wheel holders 28 and 30 is sized and shaped to receive therewithin and retain the front wheel of one bicycle. Each opposing pair of front wheel holders 28 and 30 which face one another is separated so as to be able to engage the first wheel of a bicycle at two different wheel locations. As previously explained, since the bicycle rack 1 has first and second sets of four front wheel holders 28 and 30 (corresponding to the four rear wheel holders 14-17), a maximum of four bicycles can be carried by the bicycle rack 1. However, by changing the number of front wheel holders 28 and 30, more or less than four bicycles can be carried.

As will be explained in greater detail while referring to FIGS. 9-12, each bicycle being carried by the bicycle rack 1 is supported and retained solely at the points of contact between the front and rear wheel holders 14-17, 28 and 30 and the wheels of the bicycle. That is, the rear wheel of a bicycle will be supported by the rack 1 at one of the rear wheel holders 14-17 of the lower rear wheel support arm 12, and the front wheel of the bicycle will be supported between a pair of opposing wheel holders 28 and 30 at the side bars 24 and 26 of the upper front wheel support basket 20. Hence, the size of the wheels to be received by the front and rear wheel holders will not be limited by the dimensions of the bicycle. Moreover, by virtue of the sets of front wheel holders 28 and 30 being held at an angle, the front wheel of each bicycle will be correspondingly angled relative to the rear wheel thereof. Thus, the front wheels of the bicycles being carried by the bicycle rack 1 are shown turning away from the rear of the vehicle from which the rack is being transported. However, it is within the scope of this invention for the front wheel holders 28 and 30 to be angled in a different direction so that the front wheels of the bicycles turn towards the vehicle.

A linking arm 34 which runs along one side of the vertical main support bar 3 is pivotally connected at a bottom end thereof to the rotatable lower linking arm support gusset 10. The top end of the linking arm 34 is pivotally connected to the rotatable upper linking arm support gusset 7. In particular, the bottom end of linking arm 34 is connected to the lower linking arm support gusset 10 by means of a linking pin 36 which runs laterally through gusset 10. The top end of linking arm 34 is connected to the upper linking arm support gusset 7 by means of a pivot pin 38 which runs laterally through gusset 7. By virtue of the linking arm 34, the bicycle rack 1 can be collapsed from its expanded deployed configuration (of FIG. 4) to its compact folded configuration (of FIGS. 7 and 8) by causing the upper front wheel support basket 20 to rotate downwardly (in the direction of the reference arrow 42 of FIG. 4) towards the vertical main support bar 3 and the lower rear wheel support arm 12 to simultaneously rotate upwardly (in the direction of the reference arrow 40 of FIG. 4) towards the support bar 3.

With the bicycle rack 1 in its expanded deployed configuration, the lower rear wheel support arm 12 and the upper front wheel support basket 20 are positioned outstretched from the vertical main support bar 3. A pull-out locking pin 44 (best shown in FIG. 4) is initially pushed into removable receipt by the upper linking arm support gusset 7 and through the main support bar 3 to lock the front wheel support basket 20 in the outstretched position of FIG. 4 and thereby prevent the downward rotation of basket 20 and the upward rotation of the rear wheel support arm 12 relative to the main support bar 3. Any other conventional locking system (e.g., a cam lock) may be substituted for the locking pin 44. In the expanded deployed configuration, the bicycle rack 1 is ready to receive one or more bicycles for transport (best shown in FIGS. 9 and 10).

When it is desirable to collapse the bicycle rack 1 from the expanded deployed configuration to its compact folded configuration, the locking pin 44 is pulled out from the main support bar 3 and the upper linking arm support gusset 7. With the locking pin 44 removed, a downward pushing force is applied to the upper front wheel support basket 20. The downward pushing force causes the front wheel support basket 20 to rotate with the upper linking arm support gusset 7 around the pivot pin 8 (of FIG. 8) through the gusset 7. Accordingly, the support basket 20 rotates downwardly and in the counter-clockwise direction represented by the reference arrow 42 of FIG. 4 towards the vertical main support bar 3.

By virtue of the linking arm 34 and the pivotal connection of the linking arm between the pivot pin 38 which runs through the upper linking arm support gusset 7 and the linking pin 36 which runs through the lower linking arm support gusset 10 (best shown in FIGS. 1 and 2), the downward rotation of the upper front wheel support basket 20 causes a corresponding rotation of the lower rear wheel support arm 12 upwardly and in the clockwise direction represented by the reference arrow 40 of FIG. 4. That is, the pushing force applied to the front wheel support basket 20 and the downward rotation of basket 20 result in the counterclockwise rotation of the upper linking arm support gusset 7 around pivot pin 8 in the direction of the reference arrow 46 of FIG. 4. The rotation of gusset 7 causes a linear force to be transferred along the linking arm 34 to the lower linking arm support gusset 10, whereby to cause gusset 10 to rotate around pivot pin 11 in the clockwise direction of the reference arrow 48 of FIG. 4. The clockwise rotation of gusset 10 results in the simultaneous clockwise rotation of the lower rear wheel support arm 12 upwardly towards the vertical main support bar 3.

Figure 7:
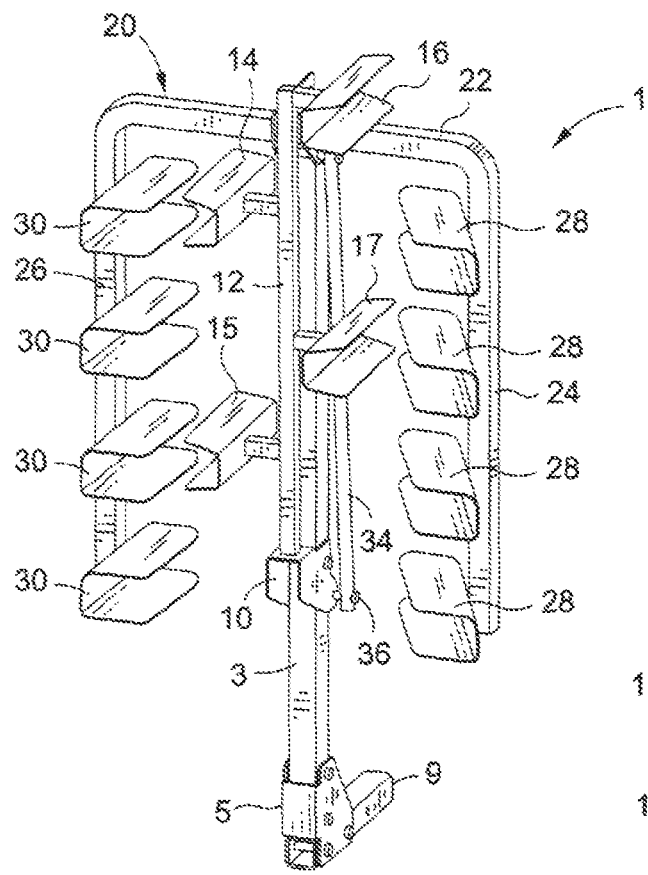
FIG. 7 is a perspective view of the collapsible bicycle rack after the bicycle rack has been collapsed to a compact folded configuration.
Figure 8:
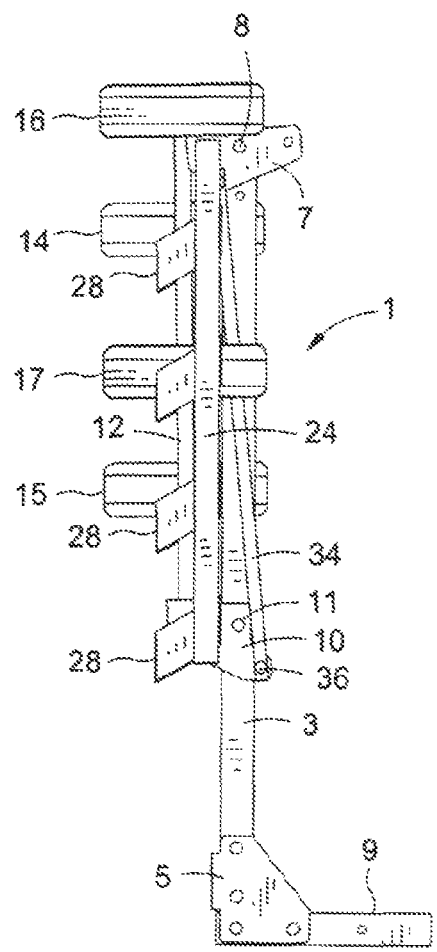
FIG. 8 is a side view of the collapsible bicycle rack in the compact folded configuration.
Figure 9:
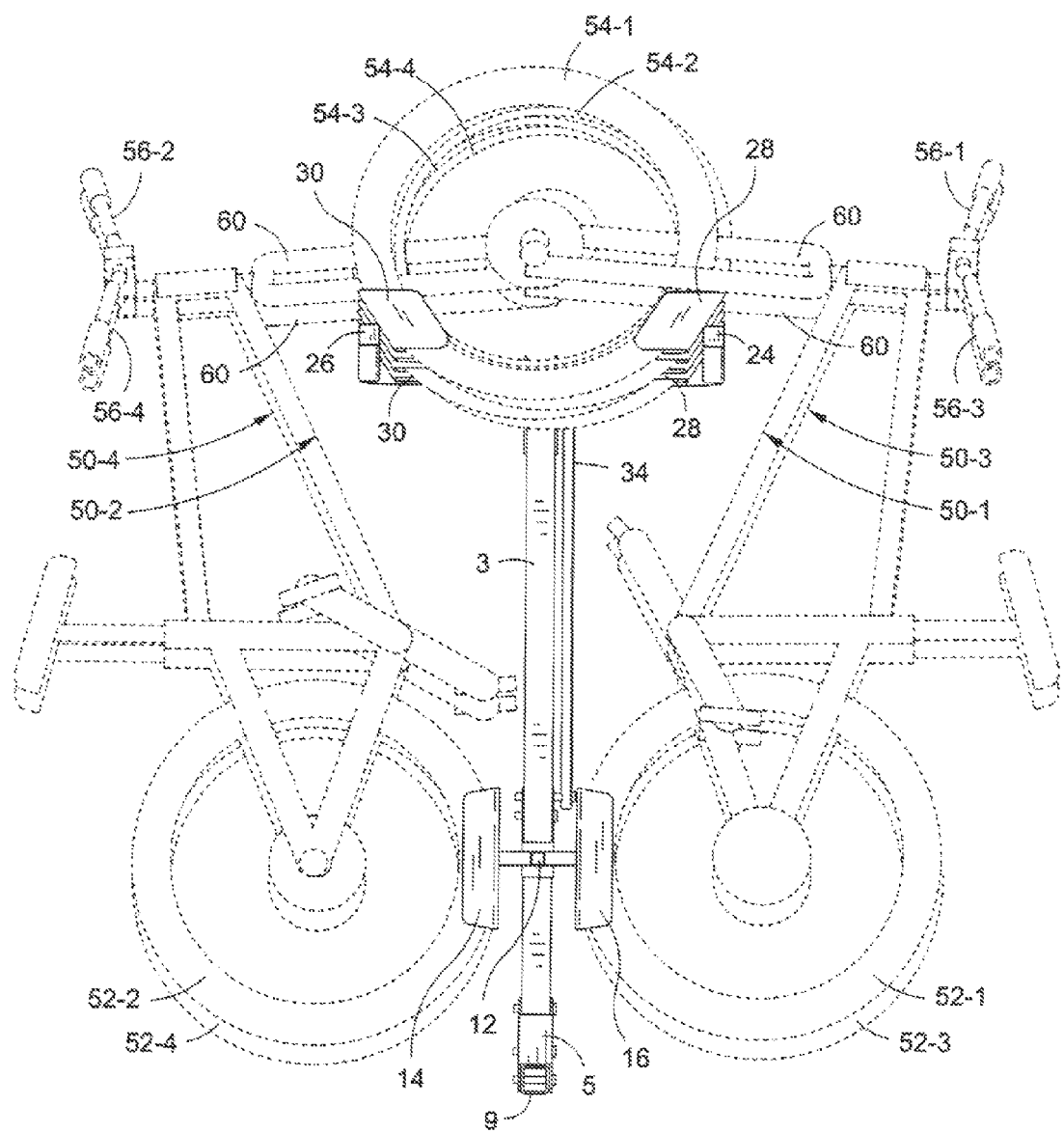
FIG. 9 is a front view of the collapsible bicycle rack in its expanded deployed configuration while carrying two pairs of bicycles.
Figure 10:
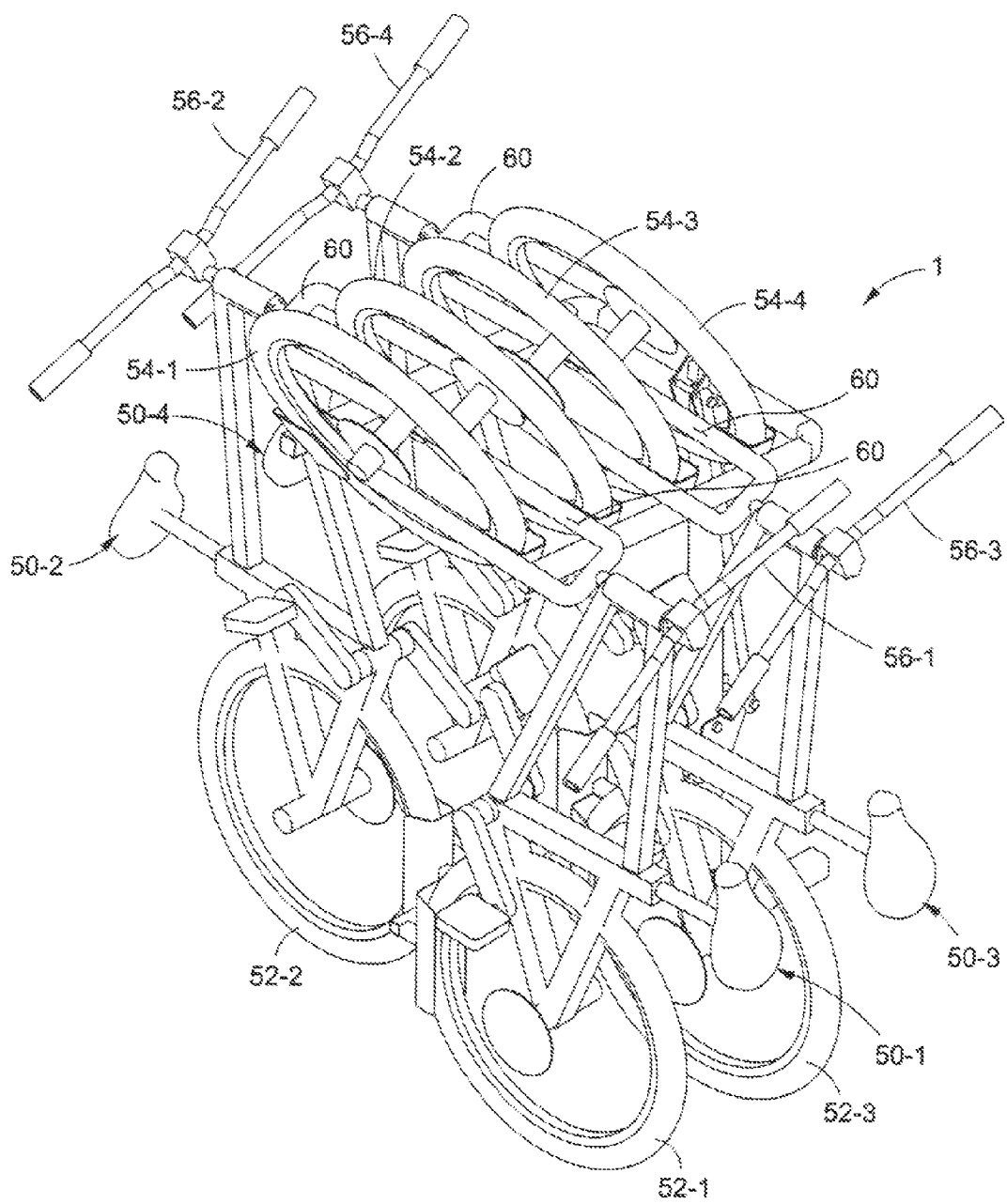
FIG. 10 is a perspective view of the collapsible bicycle rack of FIG. 9 while carrying the two pairs of bicycles.
Figure 11:
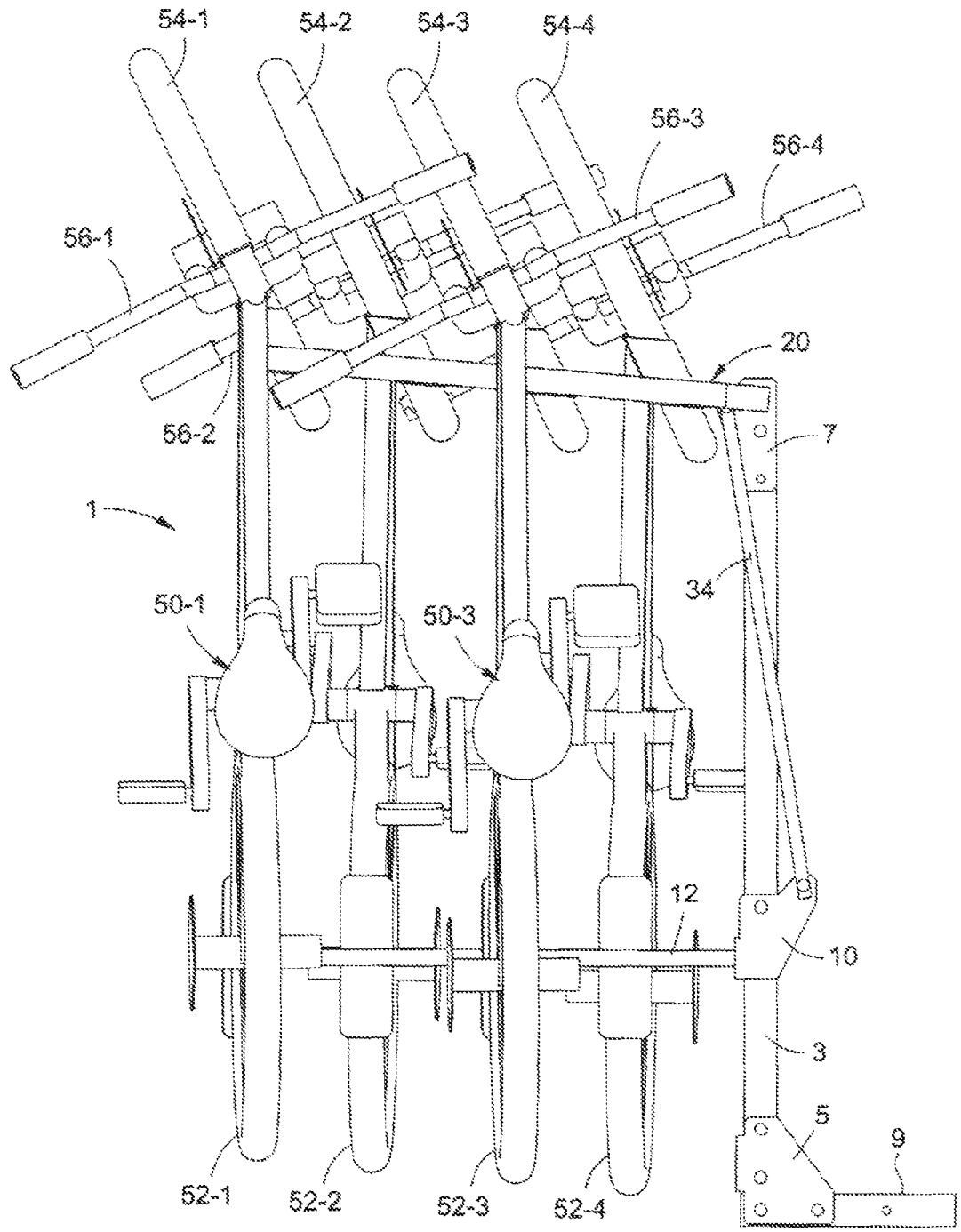
FIG. 11 is a right side view of the collapsible bicycle rack of FIG. 9 while carrying the two pairs of bicycles.
Figure 12:
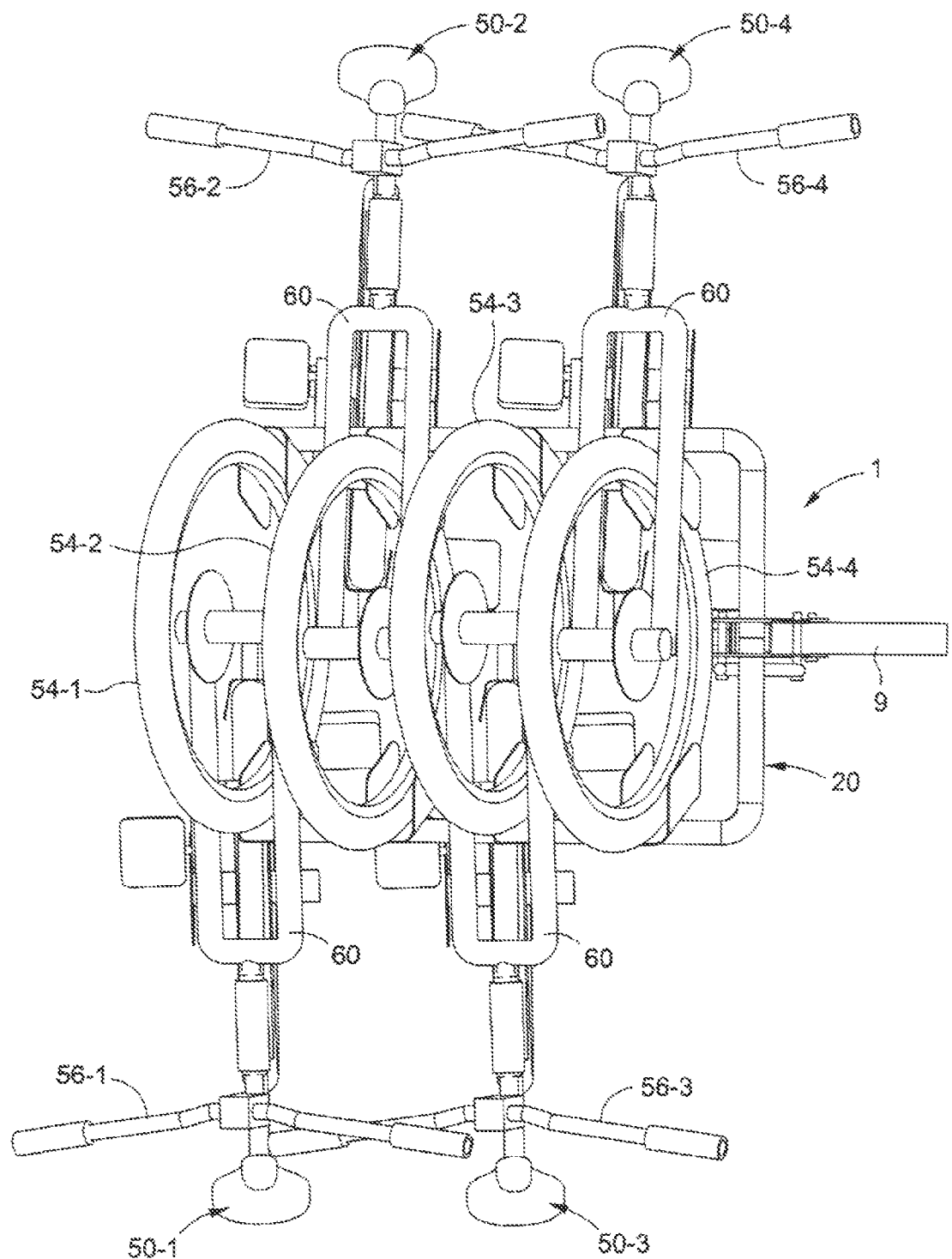
FIG. 12 is a top view of the collapsible bicycle rack of FIG. 9 while carrying the two pairs of bicycles.

FIGS. 7 and 8 show the bicycle rack 1 in its compact folded configuration after the upper front wheel support basket 20 and the lower rear wheel support arm 12 have been simultaneously rotated in opposite directions so as to lie generally side-by-side one another along the vertical main support bar 3.

Turning to FIGS. 9-12 of the drawings, the bicycle rack 1 is shown in its expanded deployed configuration at which to carry a total of 4 bicycles 50-1, 50-2, 50-3 and 50-4. However, as previously indicated, the bicycle rack 1 may carry a different number of bicycles. Moreover, and as was also explained, each bicycle being transported is advantageously attached to and supported by the rack 1 only at the front and rear wheels of the bicycle so as to avoid damage to the frame, fork and other hard components and facilitate the easy connection and removal of the bicycle from the rack with a minimum of manipulations.

With the receiver bar 9 coupled to the rear of a motor vehicle, the bicycles 50-1 . . . 50-4 are transported vertically (i.e., with their front wheels up) by the bicycle rack 1 so as to lie alongside the vertical main support bar 3. By virtue of the staggered arrangement of the rear wheel holders 14-17 along the lower rear wheel support arm 12, the rear wheels 52-1 and 52-3 of a first pair of bicycles 50-1 and 50-3 are received and retained by respective rear wheel holders 16 and 17 facing in a first direction at one side of the lower rear wheel support arm 12, and the rear wheels 52-2 and 52-4 of a second pair of bicycles 50-2 and 50-4 are received and retained by respective rear wheel holders 14 and 15 facing in an opposite direction at the opposite side of the lower rear wheel support arm 12. Thus, the rear wheels 52-1 and 52-3 are held in axial alignment with one another, and the rear wheels 52-2 and 52-4 are held in axial alignment with one another at opposite sides of the rear wheel support arm 12.

Inasmuch as the first set of front wheel holders 28 attached to the side bar 24 of the upper front wheel support basket 20 face the second set of front wheel holders 30 attached to the side bar 26 of basket 30, the front wheels 54-1, 54-2, 54-3 and 54-4 of the bicycles 50-1 . . . 50-4 are all held in spaced parallel alignment with one another. Each front wheel 54-1 . . . 54-4 from a bicycle 50-1 . . . 50-4 is received and retained by a respective pair of opposing front wheel holders 28 and 30. Since the sets of front wheel holders 28 and 30 are angled relative to the rear wheel holders 14-17, the front wheels 54-1 . . . 54-4 of bicycles 50-1 . . . 50-4 are correspondingly angled with respect to the rear wheels 52-1 . . . 52-4, whereby the longitudinal axes of the front wheels are offset. Thus, the front wheels overlap one another so that one front wheel lies above (i.e., in front of) the next (best shown in FIG. 11). In this same regard, the angled pairs of front wheel holders 28 and 30 create points of contact and retention from which the bicycles are suspended so as to be carried vertically (with their front wheel facing up) alongside the upstanding vertical main support bar 3. What is more, because each of the front and rear wheels of each bicycle is supported by a pair of front wheel holders and a pair of rear wheel holders, the bicycle rack 1 is advantageously adapted to carry bicycles of different sizes.

By virtue of the aforementioned staggered arrangement of the oppositely-facing pairs of rear wheel holders 14, 15 and 16, 17 along opposite sides of the lower rear wheel support arm 12, a first pair of bicycles 50-1 and 50-3 is carried by bicycle rack 1 upside down relative to a second pair of bicycles 50-2 and 50-4. That is to say, the forks 60 of alternating bicycles extend outwardly and in opposite directions relative to the main support bar 3 (best shown in FIG. 12). Moreover, the handlebars 56-1, 56-2, 56-3 and 56-4 of the bicycles are positioned so as to avoid contacting one another. In this case, clearance areas are created between the forks 60 of an adjacent pair of bicycles 50-1, 50-3 and 50-2, 50-4 to enable the bicycles to be nested closer together than had they been carried horizontally and side-by-side one another to result in a compact containment configuration with less overhang at the rear of the vehicle to which the bicycle rack 1 is coupled.

The invention claimed is:

1. A bicycle rack to carry at least first and second bicycles, each bicycle having front and rear wheels and a fork, said bicycle rack comprising:
    a receiver bar adapted to be attached to a hitch at the rear of a motor vehicle;
    a main support bar standing upwardly from said receiver bar;
    an upper front wheel support coupled to and extending from said main support bar, said upper front wheel support having a pair of side bars arranged in spaced parallel alignment, first and second U-shaped front wheel holders attached to one of said pair of side bars for engaging and supporting respective ones of the front wheels of the first and second bicycles at a first location and third and fourth U-shaped front wheel holders attached to the other one of said pair of side bars to lie opposite said first and second U-shaped front wheel holders for engaging and supporting the front wheels at a different location; and
    a lower rear wheel support coupled to and extending from said main support bar below said upper front wheel support, said lower rear wheel support having a first rear wheel holder connected to one side of said lower rear wheel support and a second rear wheel holder connected to the opposite side of said lower rear wheel support and lying closer to said main support bar than said first rear wheel holder,
    such that the front wheels of the first and second bicycles are respectively engaged and supported by said first and third and by said second and fourth U-shaped front wheel holders of said upper front wheel support, and the rear wheel of the first bicycle is engaged and supported by the first rear wheel holder of said lower rear wheel support and the rear wheel of the second bicycle is engaged and supported by the second rear wheel holder of said lower rear wheel support, whereby the first and second bicycles are carried by said bicycle rack upside down such that the respective front wheels of the first and second bicycles face in the same direction and the respective forks of the first and second bicycles extend in opposite directions relative to one another.

2. The bicycle rack recited in claim 1, wherein said upper front wheel support and said lower rear wheel support are coupled to said main support bar so that the first and second bicycles are carried along opposite sides of said main support bar with the front wheels of said bicycles being held respectively by said first and third and by said second and fourth U-shaped front wheel holders so as to face upwardly.

3. The bicycle rack recited in claim 1, wherein said upper front wheel support is coupled to said main support bar so as to be rotatable relative thereto.

4. The bicycle rack recited in claim 3, wherein said lower rear wheel support is coupled to said main support bar so as to be rotatable relative thereto.

5. The bicycle rack recited in claim 4, further comprising a linking arm extending between said upper front wheel support and said lower rear wheel support, such that a rotation of said upper front wheel support causes a simultaneous rotation of said lower rear wheel support.

6. The bicycle rack recited in claim 5, wherein said linking arm is pivotally coupled at a first end thereof to said upper front wheel support and pivotally coupled at an opposite end to said lower rear wheel support.

7. The bicycle rack recited in claim 6, wherein the first end of said linking arm is pivotally coupled to said upper front wheel support at an upper linking arm support that is attached to and rotatable with said upper front wheel support, said bicycle rack further comprising a first pivot pin running through each of said upper linking arm support and the first end of said linking arm.

8. The bicycle rack recited in claim 7, wherein the opposite end of said linking arm is pivotally coupled to said lower rear wheel support at a lower linking arm support that is attached to and rotatable with said lower rear wheel support, said bicycle rack further comprising a linking pin running through each of said lower linking arm support and the opposite end of said linking arm.

9. The bicycle rack recited in claim 8, further comprising a second pivot pin running through each of said lower linking arm support and said receiver bar, a rotation of said upper front wheel support being imparted to said lower linking arm support by way of said linking arm for causing said lower linking arm support to rotate around said second pivot pin and said lower rear wheel support to correspondingly rotate relative to said main support bar.

10. The bicycle rack recited in claim 1, wherein said first and second U-shaped front wheel holders lie opposite and face said third and fourth U-shaped front wheel holders, and each of first, second, third and fourth U-shaped front wheel holders being aligned at an angle relative to the first and second rear wheel holders of said lower rear wheel support so that the front wheels of the first and second bicycles are correspondingly turned at an angle relative to the back wheels thereof.

11. The bicycle rack recited in claim 1, wherein the first and second rear wheel holders of said lower rear wheel support are first and second U-shaped rear wheel holders for engaging and supporting respective ones of the rear wheels of the first and second bicycles, said first and second U-shaped rear wheel holders connected to opposite sides of said lower rear wheel support so as to face away from one another.

12. The bicycle rack recited in claim 11, wherein the first and second bicycles are contacted and held by said bicycle rack solely by means of said first, second, third and fourth U-shaped front wheel holders of said upper front wheel support and said first and second U-shaped rear wheel holders of said lower rear wheel support.

13. The bicycle rack recited in claim 1, wherein each of said upper front wheel support and said lower rear wheel support is rotatable relative to said main support bar from a deployed configuration where said upper and lower front and rear wheel supports extend outwardly from said main support bar to a folded configuration where said upper and lower front and rear wheel supports lie in generally side-by-side alignment with said main support bar.

14. The bicycle rack recited in claim 13, wherein said upper and lower front and rear wheel supports rotate in opposite directions relative to said main support bar between said deployed and folded configurations.

15. The bicycle rack recited in claim 13, wherein said upper and lower front and rear wheel supports are interconnected with one another so as to rotate simultaneously with one another between said deployed and folded configurations.

16. The bicycle rack recited in claim 15, further comprising a linking arm pivotally coupled at opposite ends thereof to said upper and lower front and rear wheel supports by which said upper and lower front and rear wheel supports are interconnected with one another, whereby a rotation of said upper front wheel support is imparted to said lower rear wheel support by way of said linking arm to cause the simultaneous rotation of said upper and lower front and rear wheel supports.

17. The bicycle rack recited in claim 13, further comprising a locking pin removably received through said upper front wheel support and said main support bar to prevent a rotation of said upper front wheel support relative to said main support bar.

18. A bicycle rack to carry at least first and second bicycles, each bicycle having front and rear wheels and a fork, said bicycle rack comprising:
 a receiver bar adapted to be attached to a hitch at the rear of a motor vehicle;
 a main support standing upwardly from said receiver bar;
 an upper front wheel support coupled to and extending from said main support, said upper front wheel support having a first front wheel holder and a second front wheel holder for engaging and supporting respective ones of the front wheels of the first and second bicycles; and
 a lower rear wheel support coupled to and extending from said main support below said upper front wheel support, said lower rear wheel support having first and opposite sides and first and second U-shaped rear wheel holders for engaging and supporting respective ones of the rear wheels of the first and second bicycles, said first U-shaped rear wheel holder having an open top and a closed bottom and being connected to a first side of said lower rear wheel support and said second U-shaped rear wheel holder having an open top and a closed bottom and being connected to the opposite side of said lower rear wheel support such that the open tops of said first and second U-shaped rear wheel holders face in opposite directions away from one another, whereby the first and second bicycles are transported vertically along and substantially parallel to said upwardly standing main support,
 the first and second front wheel holders of said upper front wheel support being turned at an angle relative to the first and second U-shaped rear wheel holders of said lower rear wheel support, such that the front wheels of the first and second bicycles are correspondingly turned at an angle with respect to the rear wheels and the front wheel of the first bicycle overlaps and lies ahead of the front wheel of the second bicycle, and
 the first and second front wheel holders of said upper front wheel support being positioned relative to the first and second U-shaped rear wheel holders of said lower rear wheel support so that the first and second bicycles are carried by said bicycle rack upside down such that the front wheels of the first and second bicycles face upwardly in the same direction and the respective forks of the bicycles extend in opposite directions relative to one another.

19. A bicycle rack to carry at least first and second bicycles having front and rear wheels, said bicycle rack comprising:
 a receiver bar adapted to be attached to a hitch at the rear of a motor vehicle;
 a main support bar standing upwardly from said receiver bar;
 an upper front wheel support pivotally coupled to and extending outwardly from said main support bar so as to be rotatable relative to said main support bar, said upper front wheel support having a first pair of front wheel holders and a second pair of front wheel holders spaced from and lying opposite said first pair of front wheel holders, said first and second pairs of front wheel holders engaging and retaining the front wheels of the first and second bicycles;
 a lower rear wheel support pivotally coupled to and extending outwardly from said main support bar below said upper front wheel support so as to be rotatable relative to said main support bar, said lower rear wheel support having first and second rear wheel holders for engaging and retaining the rear wheels of the first and second bicycles; and
 a linking arm having first and opposite ends and being pivotally coupled at the first end thereof to said outwardly extending upper front wheel support and pivotally coupled at the opposite end to said outwardly extending lower rear wheel support, such that a rotation of one of said outwardly extending upper front wheel support or said outwardly extending lower rear wheel support in a first direction is imparted to and causes a simultaneous rotation of the other one of said upper front wheel support or said lower rear wheel support in an opposite direction so that said upper and lower front and rear wheel supports lie in generally parallel alignment with one another and with said main support bar.

20. The bicycle rack recited in claim 19, further comprising a first pivot pin by which the first end of said linking arm is pivotally coupled to said upper front wheel support and a second pivot pin by which the opposite end of said linking amnn is pivotally coupled to said lower rear wheel support.

* * * * *